(12) United States Patent
Gu et al.

(10) Patent No.: US 11,692,258 B2
(45) Date of Patent: Jul. 4, 2023

(54) METHOD FOR PREPARING METAL OXIDE OR METAL HYDROXIDE NANO THIN-FILM MATERIAL BY MOLTEN SALT METHOD

(71) Applicant: ZHEJIANG UNIVERSITY, Hangzhou (CN)

(72) Inventors: Yijie Gu, Hangzhou (CN); Jinming Wu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/618,879

(22) PCT Filed: Sep. 30, 2019

(86) PCT No.: PCT/CN2019/109582
§ 371 (c)(1),
(2) Date: Dec. 13, 2021

(87) PCT Pub. No.: WO2020/206961
PCT Pub. Date: Oct. 15, 2020

(65) Prior Publication Data
US 2023/0121139 A1    Apr. 20, 2023

(30) Foreign Application Priority Data

Apr. 11, 2019  (CN) .......................... 201910290149.0

(51) Int. Cl.
C23C 2/04   (2006.01)
C23C 2/00   (2006.01)
(Continued)

(52) U.S. Cl.
CPC ............... *C23C 2/04* (2013.01); *C01B 13/18* (2013.01); *C23C 2/50* (2022.08)

(58) Field of Classification Search
CPC .......................... C01B 13/18; D06M 11/36–49
See application file for complete search history.

(56) References Cited

U.S. PATENT DOCUMENTS 9,780,356 B2 * 10/2017 Zhang .................. H01M 4/663
2016/0162104 A1    6/2016 Kim et al.

FOREIGN PATENT DOCUMENTS

CN    1468804 A    1/2004
CN    105714351 A    6/2016
(Continued)

OTHER PUBLICATIONS

International Search Report (PCT/CN2019/109582); dated Jan. 7, 2020.

*Primary Examiner* — Lois L Zheng
(74) *Attorney, Agent, or Firm* — W&G Law Group (57) ABSTRACT

Provided is a method for preparing a metal oxide or a metal hydroxide nano thin-film material by a molten salt method, which mainly comprises the following steps: heating a low-melting-point salt to a molten state, adding a substrate into the molten salt before or after melting for reaction; adding a metal source and continuing the reaction for a period of time; removing the substrate, cooling the substrate to a room temperature, cleaning and drying the substrate to obtain the metal oxide or metal hydroxide nano thin-film material; wherein, the mass ratio of the low-melting-point salt to the metal source is 100-1.5:1. The metal oxide and metal hydroxide nano-film materials with various nano-morphologies prepared by the method of the present application have morphologies that can be regulated and controlled by the types and proportions of the low-melting-point salts and metal sources.

1 Claim, 4 Drawing Sheets (51) Int. Cl.
 *C01B 13/18* (2006.01)
 *D06M 11/36* (2006.01)

(56) References Cited

FOREIGN PATENT DOCUMENTS

| CN | 108383171 A | 8/2018 |
| CN | 110092407 A | 8/2019 |

* cited by examiner

METHOD FOR PREPARING METAL OXIDE OR METAL HYDROXIDE NANO THIN-FILM MATERIAL BY MOLTEN SALT METHOD

CROSS-REFERENCE TO RELATED APPLICATIONS

The present application is a National Phase of International Application No. PCT/CN2019/109582, filed on Sep. 30, 2019, which claims priority to Chinese Application No. 201910290149.0, filed on Apr. 11, 2019, the contents of both of which are incorporated herein by reference in their entireties.

TECHNICAL FIELD

The present application belongs to the technical field of film material preparation, and particularly relates to a method for preparing various metal oxides or metal hydroxide nano thin-film materials by a molten salt method.

BACKGROUND

Metal oxides and metal hydroxides have redox activity, changeable valence states and good stability, and have great application potential and prospect in energy storage, catalysis, separation, sensing and other fields. Nano-materials have been widely studied because of their excellent characteristics different from large-size materials. Especially in the field of energy storage, metal oxides and metal hydroxides can provide a higher energy density than that of traditional carbon capacitors and a higher cycle stability than that of polymers. The energy storage methods of metal oxides and hydroxides include forming an electric double layer structure like a carbon electrode, and forming a Faraday pseudo-capacitance electrochemical reaction with electrolyte ions. On the other hand, compared with nano-powder materials, nano-film materials can grow directly on the substrate without collecting and separating steps, and the prepared materials are self-supporting, without adhesives and additives, thus greatly reducing the production steps and costs of the materials.

At present, the preparation of nano powder and thin film materials of metal oxides and hydroxides includes solvothermal methods, sol-gel methods, chemical precipitation methods, electrochemical methods and so on. Patent CN201710216261.0, for example, discloses a method for preparing transition metal oxide electrode materials with various morphologies, wherein an alcohol/water solution is used as a solvent and a salt of a transition metal is used as a raw material to prepare a transition metal oxide electrode material by a solvothermal method under the action of a precipitant and a surfactant. The synthesis process needs a high temperature and a high pressure with a high energy consumption and a high production cost, and thus is difficult control and is not conducive to mass production. Therefore, although the solvothermal method can obtain special morphologies of various metal oxides, the preparation conditions are complex and demanding, and the control of morphologies and sizes are difficult to control, which is not conducive to industrial production. For example, patent CN201710486431.7 discloses a method for preparing a metal oxide membrane for water treatment by a sol-gel method. The sol-gel method avoids the conditions of a high temperature and a high pressure, but the preparation process has a long period and complicated operations, which is also not conducive to industrialization. Another example is patent CN200410077946.4, which discloses a preparation method of a layered cobalt-aluminum double hydroxyl composite metal oxide as a supercapacitor electrode material. A total back-mixed liquid film reactor is used to carry out the coprecipitation reaction of a cobalt-aluminum mixed salt solution and an alkali solution, so that nucleation/crystallization is implemented separately, the nucleation and growth conditions of crystals are controlled respectively, and then the crystals are roasted at a certain temperature. The similar chemical precipitation method is one of the most commonly used methods for industrial production of metal oxides at present, but the steps in the production process are cumbersome, a large amount of waste liquid is produced, a high temperature is required, the coprecipitation conditions are difficult to control, and the environmental pollution is serious and the cost is high. Other preparation technologies, such as the method of depositing a sodium ion embedded manganese oxide nanosheet array on foam nickel by electrochemical deposition technology published in patent CN103065806A, show that the nanostructures on the current collector of foam nickel have weak adhesion and are easy to agglomerate and grow, which is difficult to control for large-area growth of nanosheets.

Compared with the above-mentioned preparation technology, the molten salt method has the characteristics of rapidity and high efficiency, and the preparation process has the advantages of lower energy consumption than the above common methods, without the need of a water medium in the production process, has no water pollution and thus is environmental friendliness. The molten salt can be recycled by appropriate technology. However, at present, the molten salt method can only realize the preparation of nano-powder materials, and there is no report in the field of preparation of nano-film materials. For example, CN106629613A discloses a preparation method of two-dimensional material powder of an ion intercalation type. The structure of two-dimensional material of an ion intercalation type prepared by molten salt method is a powder formed by intercalation of cations, anions or water molecules in the middle of plates, such as $K_{0.27}MnO_2 \cdot 0.54H_2O$ 和 $Zn_5(OH)_8(NO_3)_2 \cdot 2H_2O$ in this patent example, and the material composition is complex. When it is subsequently used as a functional material, for example, when it is used as an electrode active material to exert electrochemical performance, it is necessary to coat the powder material on a conductive substrate through a binder and a dispersant, which increases the practical application steps. The material prepare by that application is a thin film material of metal oxide or metal hydroxide, which has simple composition and wide application, can be directly used as a functional material without any adhesive and coat steps, and has a great potential in many fields. For example, CN107697888A discloses a preparation method of a metal oxide or a metal composite oxide. In this method, a nano-powder material is prepared by a molten salt method, and the metal oxide or metal composite oxide can be prepared only by adding a dispersion carrier and a template agent in the preparation process, which is characterized by too many steps, a high temperature and a long time. Similarly, the powder prepared by this method can be used as a functional material only after subsequent coating and drying.

Therefore, the present application provides a method for efficiently and rapidly preparing a metal oxide or a metal hydroxide nano film by a molten salt method, which is suitable for various substrates, various metal oxides and hydroxides. By adjusting the types and amounts of the molten salts and metal sources added in molten salt method, the types, shapes, sizes and quality of the metal oxides and hydroxides can be conveniently controlled. The prepared film can be directly used as a functional material, which is beneficial to industrialization.

SUMMARY

The purpose of the present application is to provide a method for preparing a metal oxide or a metal hydroxide nano-film material by a molten salt method, and realize rapid and efficient preparation at the same time. The nanometer film prepared by the method has controllable shape and size, strong universality, low cost, low energy consumption and excellent performance.

The method for preparing a metal oxide or a metal hydroxide nano thin-film material by a molten salt method of the present application mainly comprises the following steps: heating a low-melting-point salt to a molten state, adding a substrate into the molten salt before or after melting for reaction; adding a metal source and continuing the reaction for a period of time; removing the substrate, cooling the substrate to a room temperature, cleaning and drying the substrate to obtain the metal oxide or metal hydroxide nano thin-film material; wherein, the mass ratio of the low-melting-point salt to the metal source is 100-1.5:1

Furthermore, the substrate is FTO conductive glass, metal titanium foil, 304 stainless steel metal, metal copper foil, foam nickel, carbon felt cloth, carbon paper and carbon fiber cloth.

Furthermore, the low-melting-point salt refers to a salt with a melting point lower than 400° C., including nitrate, chloride, sulfate, phosphate, acetate and carbonate.

Furthermore, the metal source includes nitrate, sulfate, chloride, phosphate, titanate, tungstate, acetate, molybdate or carbonate of any one of the metal elements of copper, manganese, nickel, cobalt, zinc, iron, titanium, aluminum, vanadium, chromium, molybdenum, ruthenium, tungsten, zirconium, lanthanum and cerium.

Furthermore, the method for preparing a metal oxide or a metal hydroxide nano thin-film material by a molten salt method comprises the following main steps:

(1) cleaning the substrate to obtain a substrate with clean surface and drying;

(2) heating the low-melting-point salt to a molten state;

(3) before or after the low-melting-point salt in step (2) becomes molten, adding the substrate to react for a specific period of time;

(4) adding a metal source into the reaction system of the molten salt and the substrate, continuously raising the temperature, and reaction will occur for a predetermined period of time;

(5) removing the substrate obtained in step (4), cooling to a room temperature, and ultrasonically cleaning with deionized water;

(6) completely drying the cleaned product to obtain the metal oxide and metal hydroxide nano thin-film material.

Furthermore, in the step (2), the heating temperature is the melting point of the low-melting-point salt.

Furthermore, in step (3), the specific period of time is 5 s to 1 h.

Furthermore, in the step (4), the range of raising the temperature is from the melting point to a decomposition temperature or a boiling point of the low-melting-point salt, and the predetermined period of time is 5 s to 5 h.

Wherein, the purpose of raising the temperature in step (4) is to ensure that the molten salt does not decompose, and at the same time, the metal salt has enough energy (heat energy herein) to match with the substrate, so as to ensure the nucleation and growth on the substrate in the later stage. The specific temperature can be adjusted according to different kinds of molten salts and substrates.

The main advantages of the present application are as follows:

(1) the present application realizes the rapid and efficient preparation of metal oxides or metal hydroxide nano thin-film materials on various substrates, and can facilitate large-scale production;

(2) by adjusting the types and dosage ratios of low-melting-point salts and metal sources, the types, shapes and sizes of nano-array films can be regulated;

(3) the present application utilizes the characteristics that the low-melting-point salt has enhanced fluidity when molten, and the substrate and molten salt have a good wettability and a high matching degree, so that the nano-array film prepared by reaction has a strong adhesive force, without the need of any adhesives, and can be directly used as functional materials such as electrodes, catalysts, separation membranes and the like;

(4) the preparation method of the present application is simple and convenient, the products do not need to be separated and collected again, the preparation process is efficient, fast, environment-friendly, no water pollution is generated, the preparation cost is low, and the morphology and size of the nano-film are controllable, and the prepared nano-film materials are expected to be widely used in the energy and environmental fields such as carriers of catalysts or adsorbents, separation materials, magnetic materials, oxidative degradation materials, desulfurization or air purification materials and the like.

DESCRIPTION OF EMBODIMENTS

The present application will be further illustrated with examples below, but the present application is not limited to the following examples.

Example 1

Figure 1:
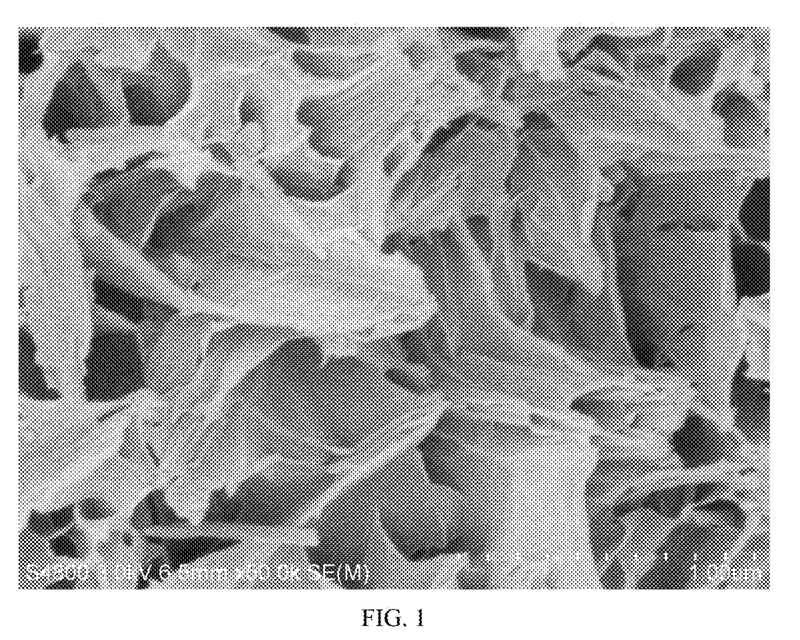
FIG. 1 is a field emission scanning electron microscope photograph of a $MnO_2$/nickel foam film prepared in Example 1.

(1) Foam nickel with a size of 4×2 cm$^2$ was selected as a substrate, an oxide layer was removed from the substrate with 10% hydrochloric acid, ultrasonically vibrated with deionized water, and completely dried in vacuum for subsequent use; (2) 10 g sodium nitrate was melted at 350° C.; (3) after sodium nitrate was completely melted, foam nickel was added to react for 1 minute; (4) 0.1 g manganese sulfate was added into the reaction system of the foam nickel and sodium nitrate, the system temperature was kept unchanged, and the reaction was continued for 1 minute; (5) the manganese oxide/nickel foam nano film obtained in step (4) was taken out, cooled to room temperature, and ultrasonically cleaned with deionized water; (6) the cleaned product was completely dried to obtain a manganese oxide/nickel foam nano thin-film material. The field emission scanning electron microscope photograph of the obtained nano-film material is shown in FIG. 1. The observation results of the surface morphology showed that the surface of the film was an array of manganese oxide nanoribbons perpendicular to the plane of nickel foam, and one side of the four nanoribbons was connected to form a pointed radial shape. The thickness of the nanoplatelets was about 5 nm and the length was about 1 μm.

Example 2

Figure 2:
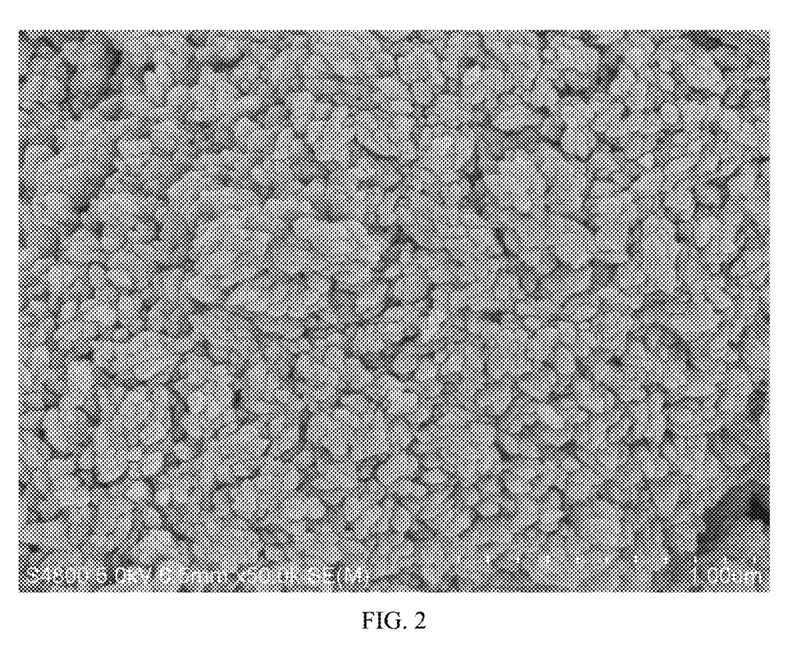
FIG. 2 is a field emission scanning electron microscope photograph of a CuO/carbon fiber cloth film prepared in Example 2.

(1) A carbon fiber cloth with a size of 4×2 cm$^2$ was selected as a substrate, and the substrate was ultrasonically washed with deionized water and dried for subsequent use; (2) 4.3 g of potassium nitrate was melted at 380° C.; (3) after potassium nitrate was completely melted, carbon fiber cloth was added to react for 2 minutes; (4) 2.9 g of copper chloride was added into the reaction system of the carbon fiber cloth and potassium nitrate, the temperature was raised by 10° C., and reaction was continued for 30 seconds; (5) the copper oxide/carbon fiber cloth nano film obtained in step (4) was taken out, cooled to the room temperature, and ultrasonically cleaned with deionized water; (6) the cleaned product was completely dried to obtain a copper oxide/carbon fiber cloth nano thin-film material. The field emission scanning electron microscope photos of the obtained nano-film materials are shown in FIG. 2. The observation results of surface morphology showed that the surface of the film has nanoparticles growing from head to tail one after another, and the nano-structure layer was uniform and dense, with the length of the nano-particles about 50 nm and the width of nano-particles about 10 nm.

Example 3

Figure 3:
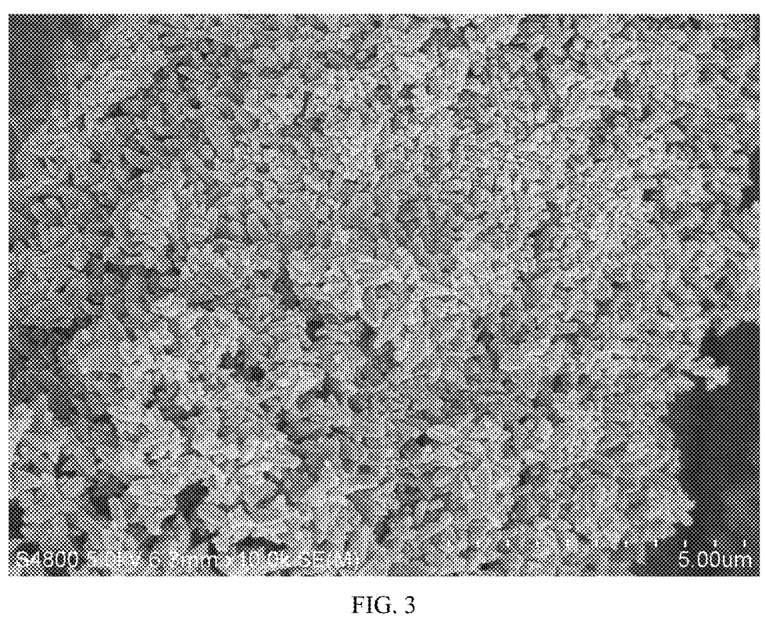
FIG. 3 is a field emission scanning electron microscope photograph of a CuO/carbon fiber cloth film prepared in Example 3.

(1) A carbon fiber cloth with a size of 4×2 cm$^2$ was selected as a substrate, and the substrate was ultrasonically washed with deionized water and dried for subsequent use; (2) 2.6 g of potassium nitrate was melted at 380° C.; (3) after potassium nitrate was completely melted, carbon fiber cloth was added to react for 10 minutes; (4) 0.17 g of copper nitrate was added into the reaction system of the carbon fiber cloth and potassium nitrate, the system temperature was kept unchanged, and the reaction was continued for 10 seconds; (5) the copper oxide/carbon fiber cloth nano film obtained in step (4) was taken out, cooled to the room temperature, and ultrasonically cleaned with deionized water; (6) the cleaned product was completely dried to obtain a copper oxide/carbon fiber cloth nano cloth film material. The field emission scanning electron microscope photos of the obtained nano-film materials are shown in FIG. 3. The observation results of surface morphology showed that the surface of the film has uniformly distributed nanorods with a length of about 400 nm and a width of about 15 nm.

Example 4

Figure 4:
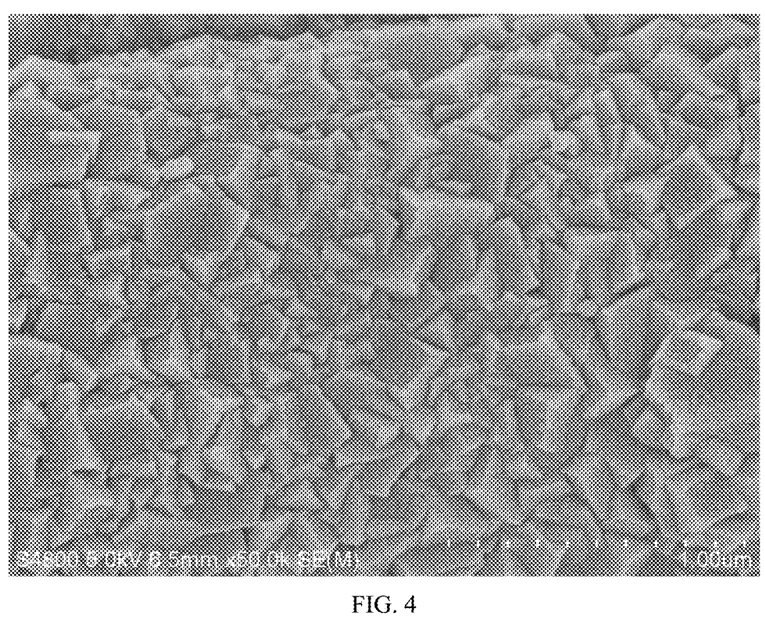
FIG. 4 is a field emission scanning electron microscope photograph of a NiO/carbon felt film prepared in Example 4.

(1) A carbon felt with a size of 4×2 cm$^2$ was selected as a substrate, the substrate was ultrasonically vibrated with deionized water, and dried for subsequent use; (2) 2 g sodium nitrate was melted at 350° C.; (3) after sodium nitrate was completely melted, carbon felt cloth was added to react for 5 minutes; (4) 0.13 g of nickel nitrate was added into the reaction system of the carbon felt cloth and sodium nitrate, the temperature was raised by 5° C. and reaction was continued for 10 seconds; (5) the nickel oxide/carbon felt nano film obtained in step (4) was taken out, cooled to the room temperature, and ultrasonically cleaned with deionized water; (6) the cleaned product was completely dried to obtain a nickel oxide/carbon felt nano thin-film material. The field emission scanning electron microscope photograph of the obtained nano-thin film material was shown in FIG. 4. The observation results of surface morphology showed that the surface of the film has cross-grown nano-cubic crystals with a thickness of about 50 nm, an aspect ratio of about 1:1 and a size of about 200 nm.

Example 5

Figure 5:
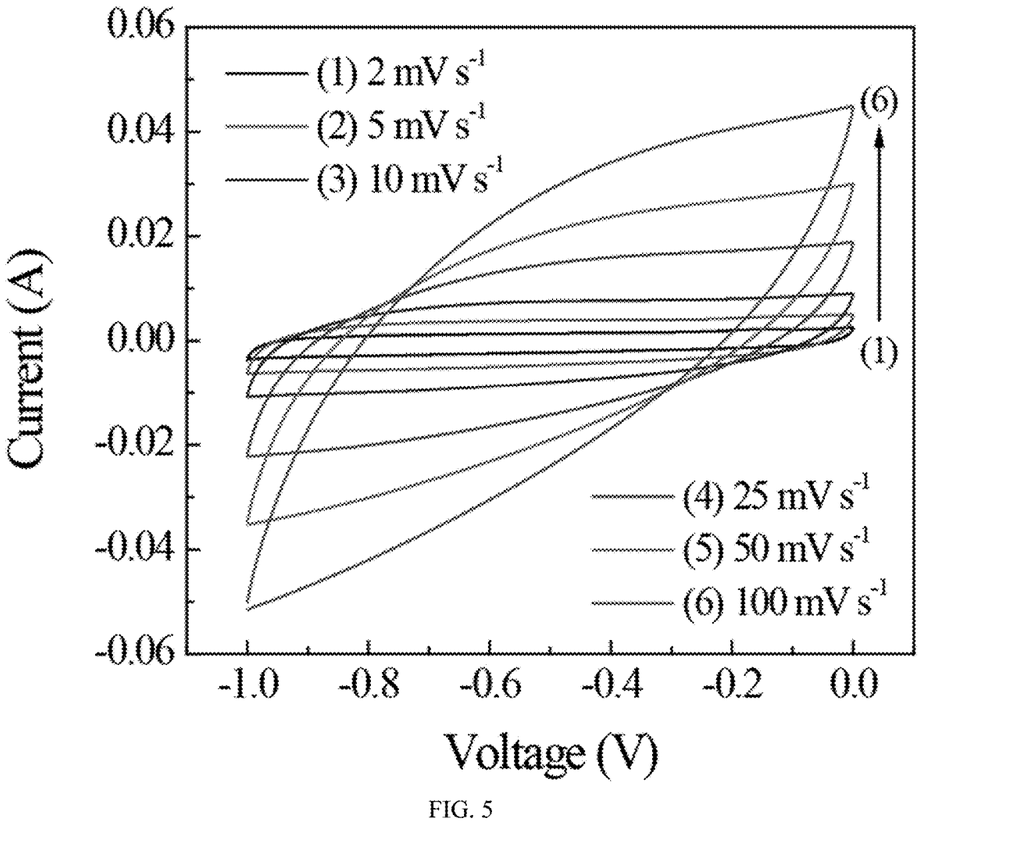
FIG. 5 is a cyclic voltammetric graph of a $Ni(OH)_2$/carbon fiber cloth film prepared in Example 5.

(1) A carbon fiber cloth with a size of 4×2 cm$^2$ was selected as a substrate, and the substrate was ultrasonically washed with deionized water and dried for subsequent use; (2) 5 g of potassium nitrate was melted at 380° C.; (3) after the potassium nitrate was completely melted, carbon fiber cloth was added to react for 0.5 hours; (4) 0.3 g of nickel nitrate was added into the reaction system of the carbon fiber cloth and potassium nitrate, the temperature was raised by 5° C. and reaction was continued for 10 seconds; (5) the nickel hydroxide/carbon fiber cloth nano film obtained in step (4) was taken out, cooled to the room temperature, and ultrasonically cleaned with deionized water; (6) the cleaned product was completely dried to obtain a nickel hydroxide/carbon fiber cloth nano thin-film material. The obtained nano-film material can be directly used as an electrode, and its cyclic voltammetric curve is shown in FIG. 5. The electrochemical performance results showed that the area specific capacitance was 1785.25 mF cm$^{-2}$ after voltage scanning at a speed of 2 mV s$^{-1}$ in 6 M potassium hydroxide electrolyte, which showed that the nickel oxide/carbon fiber cloth nano-film array prepared by this method had excellent electrochemical performance and good application prospect for electrochemical energy storage.

Example 6

(1) A carbon fiber cloth with a size of 4×2 cm$^2$ was selected as a substrate, and the substrate was ultrasonically washed with deionized water and dried for subsequent use; (2) 5 g of potassium nitrate was melted at 380° C.; (3) after the potassium nitrate was completely melted, carbon fiber cloth was added to react for 0.5 hours; (4) 0.5 g manganese chloride was added into the reaction system of the carbon fiber cloth and potassium nitrate, the temperature was raised by 2° C. and the reaction was continued for 40 seconds; (5) the $Mn_3O_4$/carbon fiber cloth nano film obtained in step (4) was taken out, cooled to the room temperature, and ultrasonically cleaned with deionized water; (6) the cleaned product was completely dried to obtain a $Mn_3O_4$/carbon fiber cloth nano thin-film material. The X-ray diffraction pattern of the obtained nano-film material is shown in curve a of FIG. 6. The results showed that the oxide was manganic oxide. According to the standard card PDF #80-0382, the strongest peak at 36.08 corresponded to the (211) crystal plane of manganic oxide, and the second strongest peak at 32.4 corresponded to the (103) crystal plane.

Example 7

(1) 304 stainless steel with a size of 4×2 cm² was selected as a substrate, and the substrate was cleaned with 10% hydrochloric acid first, then ultrasonically washed with deionized water and dried for subsequent use; (2) 5 g of potassium nitrate was melted at 380° C.; (3) after potassium nitrate was completely melted, stainless steel was added to react for 1 hour; (4) 0.25 g manganese sulfate was added into the reaction system of the stainless steel and potassium nitrate, the temperature was raised by 10° C., and reaction was continued for 0.5 h; (5) the $MnO_2$/stainless steel nano film obtained in step (4) was taken out, cooled to the room temperature, and ultrasonically cleaned with deionized water; (6) the cleaned product was completely dried to obtain a $MnO_2$/stainless steel nano thin-film material. The X-ray diffraction pattern of the obtained nano-thin film material is shown in Curve B of FIG. 6. The results showed that the oxide was a mixed phase of manganese dioxide and manganese tetroxide.

Example 8

(1) FTO conductive glass with a size of 4×2 cm² was selected as a substrate, the substrate was ultrasonically washed with deionized water, and dried for subsequent use; (2) 5 g of potassium nitrate was melted at 380° C.; (3) after the potassium nitrate was completely melted, and FTO was added to react for 10 seconds; (4) 0.25 g manganese sulfate was added into the reaction system of FTO and potassium nitrate, the temperature was raised by 10° C. and reaction was continued for 10 seconds; (5) the $MnO_2$/FTO conductive glass nano film obtained in step (4) was taken out, cooled to the room temperature, and ultrasonically cleaned with deionized water; (6) the cleaned product was completely dried to obtain a $MnO_2$/FTO conductive glass nano thin-film material. The X-ray diffraction pattern of the obtained nano-film material is shown in curve C of FIG. 6. The results showed that the oxide was manganese dioxide.

Example 9

(1) A metal Ti foil with a size of 4×2 cm² was selected as a substrate, the substrate was ultrasonically washed with deionized water, and dried for subsequent use; (2) 3 g sodium nitrate was melted at 350° C.; (3) titanium foil was added to react for 10 seconds after sodium nitrate was completely melted; (4) 0.17 g manganese sulfate was added into the reaction system of titanium foil and sodium nitrate, the temperature was raised by 10° C. and reaction was continued for 10 seconds; (5) the $MnO_2$/titanium foil nano film obtained in step (4) was taken out, cooled to the room temperature, and ultrasonically cleaned with deionized water; (6) the cleaned product was completely dried to obtain $MnO_2$/titanium foil nano thin-film material. The X-ray diffraction pattern of the obtained nano-film material is shown in Curve D of FIG. 6. The results showed that the oxide was a mixed phase of manganese dioxide and manganese trioxide.

Example 10

(1) A carbon fiber cloth with a size of 4×2 cm² was selected as a substrate, the substrate was ultrasonically washed with deionized water, and dried for subsequent use; (2) 2.5 g sodium nitrate was melted at 350° C.; (3) the carbon fiber cloth was added to react for 1 hour after sodium nitrate was completely melted; (4) 0.15 g copper sulfate was added into the reaction system of carbon fiber cloth and sodium nitrate, the temperature was raised by 10° C. and reaction was continued for 30 seconds; (5) the CuO/carbon fiber cloth nano film obtained in step (4) was taken out, cooled to room temperature, and ultrasonically cleaned with deionized water; (6) the cleaned product was completely dried to obtain a CuO/carbon fiber cloth nano thin-film material. The X-ray diffraction pattern of the obtained nano-film material is shown in curve E of FIG. 6. The results showed that the oxide was copper oxide.

Example 11

(1) A carbon fiber cloth with a size of 4×2 cm² was selected as a substrate, the substrate was ultrasonically washed with deionized water, and dried for subsequent use; (2) 2.5 g sodium nitrate was melted at 350° C.; (3) the carbon fiber cloth was added to react for 1 hour after sodium nitrate was completely melted; (4) 0.1 g copper chloride was added into the reaction system of carbon fiber cloth and sodium nitrate, the temperature was raised by 10° C. and reaction was continued for 30 seconds; (5) the CuO/carbon fiber cloth nano film obtained in step (4) was taken out, cooled to the room temperature, and ultrasonically cleaned with deionized water; (6) the cleaned product was completely dried to obtain a CuO/carbon fiber cloth nano thin-film material. The X-ray diffraction pattern of the obtained nano-thin film material is shown in curve F of FIG. 6. The results showed that the oxide was copper oxide.

Example 12

(1) A carbon fiber cloth with a size of 4×2 cm² was selected as a substrate, the substrate was ultrasonically washed with deionized water, and dried for subsequent use; (2) 2.5 g sodium nitrate was melted at 350° C.; (3) the carbon fiber cloth was added to react for 1 hour after sodium nitrate was completely melted; (4) 0.145 g copper nitrate was added into the reaction system of carbon fiber cloth and sodium nitrate, the temperature was raised by 10° C. and reaction was continued for 10 seconds; (5) the CuO/ carbon fiber cloth nano film obtained in step (4) was taken out, cooled to room temperature, and ultrasonically cleaned with deionized water; (6) the cleaned product was completely dried to obtain a CuO/ carbon fiber cloth nano thin-film material. The X-ray diffraction pattern of the obtained nano-film material is shown in curve G of FIG. 6. The results showed that the oxide was copper oxide.

Example 13

(1) A carbon fiber cloth with a size of 4×2 cm² was selected as a substrate, the substrate was ultrasonically washed with deionized water, and dried for subsequent use; (2) 2.5 g of potassium nitrate was melted at 380° C.; (3) after the potassium nitrate was completely melted, the carbon fiber cloth was added to react for 0.5 hours; (4) 0.143 g cobalt chloride was added into the reaction system of carbon fiber cloth and potassium nitrate, the temperature was raised by 10° C., and reaction was continued for 10 seconds; (5) the $Co_3O_4$/carbon fiber cloth nano film obtained in step (4) was taken out, cooled to the room temperature, and ultrasonically cleaned with deionized water; (6) the cleaned product was completely dried to obtain a $Co_3O_4$/carbon fiber cloth nano thin-film material. The X-ray diffraction pattern of the obtained nano-film material is shown in curve H of FIG. 6. The results showed that the oxide was cobaltosic oxide.

Example 14

(1) A carbon felt cloth with a size of 4×2 cm² was selected as a substrate, the substrate was ultrasonically washed with deionized water, and dried for subsequent use; (2) 2.5 g of potassium nitrate was melted at 380° C.; (3) after the potassium nitrate was completely melted, the carbon fiber cloth was added to react for 0.5 hours; (4) 0.17 g cobalt nitrate was added into the reaction system of carbon felt cloth and potassium nitrate, the melting temperature of potassium nitrate was kept unchanged, and reaction was continued for 10 seconds; (5) the $Co_3O_4$/carbon felt nano film obtained in step (4) was taken out, cooled to room temperature, and ultrasonically cleaned with deionized water; (6) the cleaned product was completely dried to obtain a $Co_3O_4$/carbon felt nano thin-film material. The X-ray diffraction pattern of the obtained nano-film material is shown in Curve I of FIG. 6. The results showed that the oxide was cobaltosic oxide.

The X-ray diffraction patterns of metal oxide nano-film materials prepared in Examples 6 to 14 of the present application were as follows: a was a $Mn_3O_4$/carbon fiber cloth film prepared in Example 6, b was a $MnO_2$/304 stainless steel film prepared in Example 7, c was a $MnO_2$/FTO conductive glass film prepared in Example 8, d is $MnO_2$/metal titanium foil film prepared in Example 9, e was CuO/carbon fiber cloth film prepared in Example 10, f was a CuO/carbon fiber cloth film prepared in Example 11, g was CuO/carbon fiber cloth film prepared in Example 12, h was $Co_3O_4$/carbon fiber cloth film prepared in Example 13, and i was a $Co_3O_4$/carbon felt film prepared in Example 14. Comparing the curves a-d of FIG. 6, it can be seen that various oxides of manganese metal can be grown on different substrates by adjusting different preparation parameters and raw materials.

Figure 6:
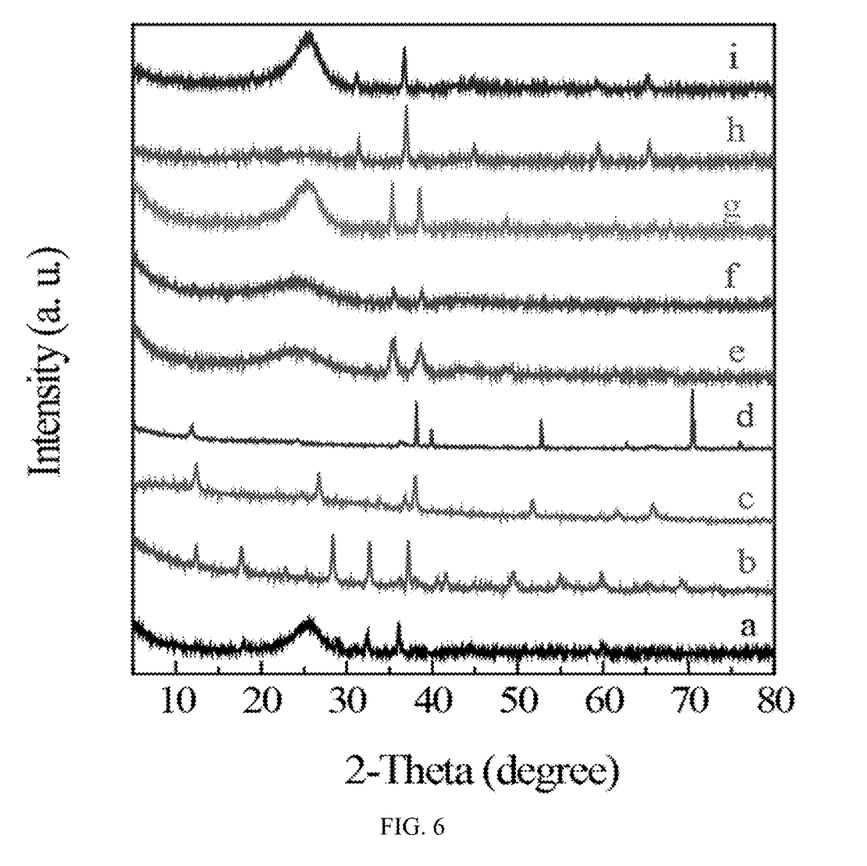
FIG. 6 is the X-ray diffraction patterns of metal oxide nano films prepared in Examples 6 to 14, specifically: a is $Mn_3O_4$/carbon fiber cloth film prepared in Example 6, b is a $MnO_2$/304 stainless steel film prepared in Example 7, c is a $MnO_2$/FTO conductive glass film prepared in Example 8, d is a $MnO_2$/metal titanium foil film prepared in Example 9, e is a CuO/ carbon fiber cloth film prepared in Example 10, f is a CuO/carbon fiber cloth film prepared in Example 11, g is a CuO/carbon fiber cloth film prepared in Example 12, h is a $Co_3O_4$/carbon fiber cloth film prepared in Example 13, and i is a $Co_3O_4$/carbon felt film prepared in Example 14.

Comparing the relative peak intensity of diffraction peak of e-g curves in FIG. 6, it can be seen that the quality of the nano-array of CuO/carbon fiber cloth film can be controlled by adjusting the preparation parameters on the same substrate. It can be further seen from the curves h-i of FIG. 6 that this preparation technology is suitable for various kinds of metal oxides.

The above examples and applications are the specific embodiments of the technical solution of the present application, and are used to further describe the technical solution of the present application. However, the design concept of the present application is not limited thereto, and any simple modifications, equivalent changes or improvements made according to the technical essence of the present application should still be within the protection scope of the technical solution of the present application.

What is claimed is:

1. A method for preparing a metal oxide or a metal hydroxide nano thin-film material by a molten salt method, comprising the following steps: heating a low-melting-point salt to a molten state, adding a substrate into the molten salt before or after melting and reaction will occur for 5 s to 1 h; then adding a metal source, continuing to raise a temperature or keeping the temperature unchanged, and reaction will occur for a predetermined period of time; removing the substrate, cooling the substrate to a room temperature, cleaning and drying the substrate to obtain metal oxide or metal hydroxide nano thin-film material; wherein, a mass ratio of the low-melting-point salt to the metal source is 100-1.5:1;

the substrate is FTO conductive glass, metal titanium foil, 304 stainless steel metal, metal copper foil, nickel foam, carbon felt cloth, carbon paper or carbon fiber cloth;

the low-melting-point salt refers to a salt with a melting point lower than 400° C., comprising nitrate, chloride, sulfate, phosphate, acetate or carbonate;

the metal source comprises nitrate, sulfate, chloride, phosphate, titanate, tungstate, acetate, molybdate or carbonate of any one of metal elements of copper, manganese, nickel, cobalt, zinc, iron, titanium, aluminum, vanadium, chromium, molybdenum, ruthenium, tungsten, zirconium, lanthanum and cerium;

a range of raising the temperature is between a melting point and a decomposition temperature or a boiling point of the low-melting-point salt, and the predetermined period of time is 5s to 5h.

* * * * *